United States Patent [19]

Notermans et al.

[11] Patent Number: 4,843,571
[45] Date of Patent: Jun. 27, 1989

[54] OFFICE AUTOMATION SYSTEMS

[75] Inventors: Ronald M. W. Notermans, JV Velden; Paulus W. E. Verhelst, PV Venlo; Charles Lapoutre, TB Nuenen; Hendricus W. H. M. Kessels, AN Venlo, all of Netherlands

[73] Assignee: OCE-Nederland B. V., Venlo, Netherlands

[21] Appl. No.: 879,062

[22] Filed: Jun. 26, 1986

[30] Foreign Application Priority Data

Jul. 1, 1985 [NL] Netherlands ............... 8501888

[51] Int. Cl.⁴ .................... G06F 3/09; G06F 15/02
[52] U.S. Cl. ................................ 364/519; 364/518
[58] Field of Search ................. 364/518-520, 364/523; 340/703, 723, 747; 101/306

[56] References Cited

U.S. PATENT DOCUMENTS 4,648,047 3/1987 Berkland et al. ............... 364/519
4,698,755 10/1987 Okazaki et al. ................ 364/519
4,704,698 11/1987 Reiniger ....................... 364/523

FOREIGN PATENT DOCUMENTS 61571    3/1981 European Pat. Off. .
91082    5/1984 Japan .
127182   7/1984 Japan .
1444533  8/1976 United Kingdom .

Primary Examiner—Gary V. Harkcom
Assistant Examiner—H. R. Herndon
Attorney, Agent, or Firm—Reed Smith Shaw & McClay

[57] ABSTRACT

An improvement in an office automation system for composing and printing text such that when the presence of an operator is required at the printer, the operator can instruct the system to delay the printing action and wait for a command to start printing. The start command may be generated by the printer itself, when a certain required action has been performed, or by the operator, by means of keying in a code at the control panel of the printer. A display at the control panel of the printer may show a message related to the cause of the delay.

4 Claims, 1 Drawing Sheet

OFFICE AUTOMATION SYSTEMS

FIELD OF THE INVENTION

The invention relates to an office automation system and particularly to a system which includes a second control means having a detection system which responds to an operator controlled event for operating a printer function.

BACKGROUND OF THE INVENTION

Office automation systems are generally well known, see for example, Japanese Patent Application Nos. A-59127182 and A-5991082 and British Pat. No. 1 444 533. Also known are systems having a memory means for storing coded information and a printer which can print coded information on a sheet of receiving material fed to the printing station of the printer. Typically, these systems include at least one command inputting device for inputting control commands and a control system which respond to commands for carrying out a printing job. The control system usually draws from the memory during the performance of the printing job, the information specified by the first control command and feeds it to the printer for printing. A system of this type is described in European Patent Application No. 61 571.

In the system described in the European application, a number of word processors are connected to a common printer. A printing job can be started from each word processor. If a printing job has to be performed by means of such a system, a number of operations have first to be carried out by the operator at the printer, such as changing the type of paper. In such case, the operator will first have to carry out these operations and then input the order for carrying out the printing job. If the printer is at some distance from the work station, as is not unusual in large office systems, the operator is often required to go back and forth from the work station to the printer.

Requirements for operator attention are annoying at best and substantially reduce the efficiency of the system. Accordingly, it is an object of the invention to provide a control means to obviate the need for operator intervention.

SUMMARY OF THE INVENTION

Generally, the present invention provides an office automation system with a detection means for detecting a specific event caused by the operator with the printer. The detection means responses to a second control command added to a first control command for detecting whether the event determined by the second control command takes place. In response to the second control command the control system postpones the start of the performance of the printing job until the detection signal has been received after detecting the event.

In the office automation system of the present invention, the operator can postpone the performance of the printing job by inputting an extra control command. The printing job is postponed until the operator has carried out at the printer the operations determined by the additional control program. These operations are detected by the control system so that after detection of the operations, the delay is cancelled and there is no need for the operator to go back to the command inputting device to restart the printer.

In another embodiment the printer is provided with an inputting device for inputting a code by the operator. The detection means in response to the said second control determines whether the input code corresponds to the required code and, if it does, it provides a detection signal which the operator can cancel to postpone the start of the printing job.

With embodiment printing can be postponed, such as in the case of printing very confidential information, until an authorized person is present at the printer and has inputted the required code. In such situations, the code to be input will generally be a secret identity code.

In another embodiment of the invention the printer is provided with a semi-automatic feeder which conveys to the printing station a sheet of receiving material manually introduced into the semi-automatic feeder. The detection means in response to the second control command detects whether a sheet is present in the semi-automatic feeder. If a sheet is present it is detected and a detection signal is provided. This affords the opportunity for easily printing on a different type of paper fed via the semi-automatic feeder.

Further embodiments are provided in which printer is provided with a display means for displaying a message. Also, the printer is provided with means which can display a message determined by the second control command in the event of the control device waiting for the said detection signal prior to starting the printing job determined by the first control command.

The invention and other advantages thereof will be explained in detail hereinafter with reference to the accompanying drawing.

BRIEF DESCRIPTION OF THE DRAWING

The sole FIGURE is a diagrammatic representation of a preferred embodiment of the invention.

PRESENTLY PREFERRED EMBODIMENTS

Figure 1:
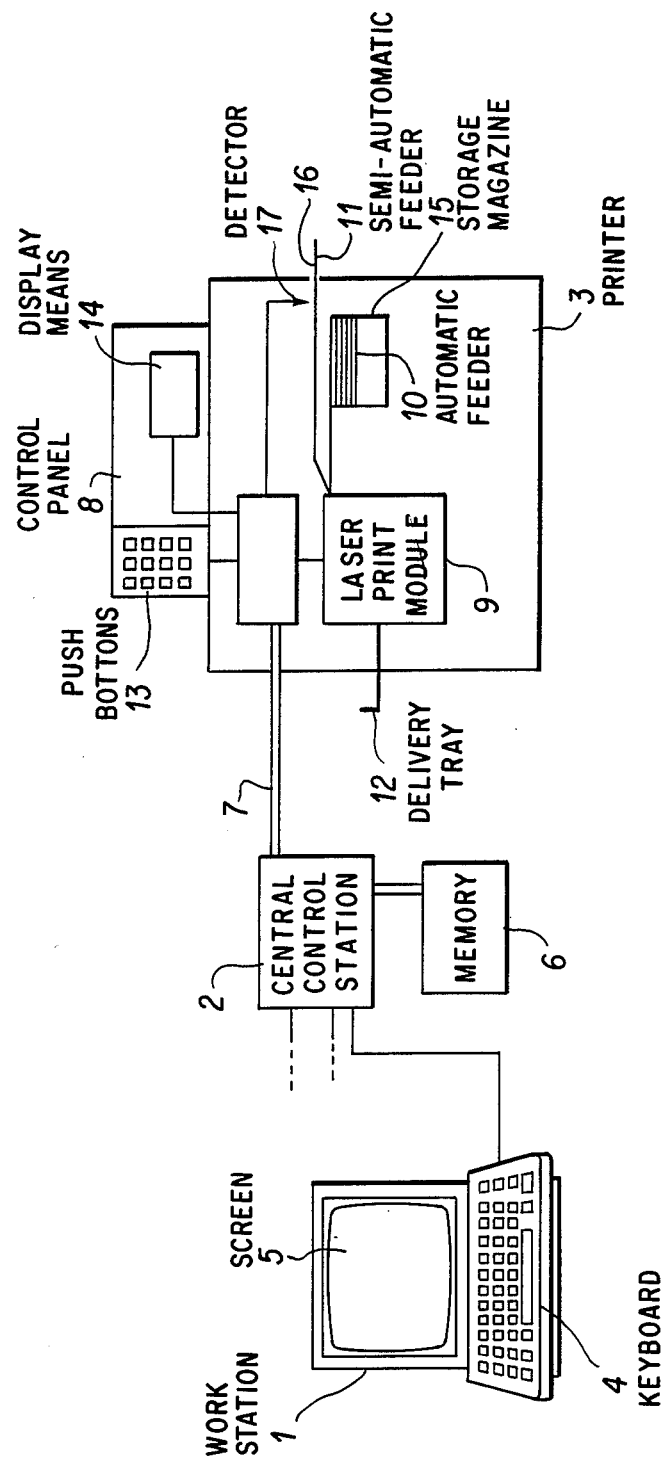

Referring to the sole figure, the office automation system comprises a number of work stations 1 coupled via a central control station 2 to a common printer 3. Work station 1 is of a conventional type, such as a word processor, provided with a keyboard 4 and a screen 5. Keyboard 4 can be used to input and edit texts and for inputting control commands for the office automation system. The input or edited text can be displayed on the screen.

Central control station 2 comprises a memory 6 in which the input text information is stored. Central control station 2 is connected via a data transmission channel 7 to printer 3. Printer 3 is preferably a laser printer of conventional type comprising a control panel 8, a laser print module 9, an automatic feeder 10, a semiautomatic feeder 11 and a delivery tray 12. Control panel 8 is provided with push buttons 13 for manually inputting codes and display means 14 for displaying.

By means of automatic feeder 10 it is possible to feed sheets of receiving material from a storage magazine 15 to laser print module 9. Sheets of receiving material fed manually to input slot 16 can be introduced by means of the semi-automatic feeder 11. Information fed to the printer via data transmission channel 7 is printed in laser print module 9 on a sheet fed via the automatic feeder 10 or the semi-automatic feeder 11. After the information has been printed in the laser print module 9 on a fed sheet the printed sheet is deposited in the tray 12.

If a user of a conventional office automation system wishes to print part of the text information stored in memory 6, a standard input command is introduced to start a printing job via keyboard 4 of work station 1. The latter transmits the input command to central control station 2, which then creates a printing job for sending the text information specified by the said input command from memory 6. The newly created printing job is put into a queue of printing jobs which has already been created but not yet finished. The central control station 2 calculates a first time required by the printer to perform the newly created printing job and sends this information to work station 1. Moreover, the expected total time needed for printing all of the printing jobs in the queue is calculated and the total time (in second time) is also sent to work station 1 in question.

By displaying these times on the screen of the work station and by having the second time counted back to zero with a real clock, the operator always knows exactly when his new printing job can be performed.

By inputting additional successive printing jobs, work station 1 displays the calculated times for every job together with a job dedicated running indicator. Central control station 2 processes the printing jobs in the queue in order. As soon as the printer has completed printing the information offered by a preceding job, the next printing job in the queue is started. After the printing job has been started, central control 2 draws the text information for printing from memory 6 and transmits it via data transmission channel 7 to printer 3, in which the information is printed on the sheet-like receiving material offered to the laser print module 9 via one of the feeders.

In the present invention, a plurality of commands to control the performance of the printing job can be added to the standard input commands used to starting the printing jobs. A command of this kind may, for example, indicate that the paper in magazine 10 must be changed before starting the printing job. Another command, for example, may indicate that the information must be printed on a sheet of receiving material input via the semi-automatic feeder 11. Another command, for example, may indicate that the printing job may not be started until a certain identity code has been input via the keys 13 on the control panel 8. This identity code may be added to the command. Changing the paper in the magazine 10 may, for example, be necessary if the information to be printed is to be produced on a type of paper differing from a standard type, e.g., if it is required to print on a different color paper, or if a form is to be used which has a preprinted section.

The use of the semi-automatic feeder may, for example, be very attractive in preparing reports, in which only the front page has to be printed on a different type of paper. The use of the identity code has particular advantages in printing confidential information. In this way it is possible to hold up printing the confidential information until an authorized person is present at the printer, thus minimizing any risk of confidential information coming into the hands of people for whom it is not intended. If a command indicating that a paper change in magazine 10 is necessary, it is added to the input command for starting a printing job.

In such case the printing process proceeds as follows: after the input command has been inputted, a printing job is created in the usual way and put in the queue. However, the printing job is not started as soon as that job comes to the head of the queue. What is done is that a message is sent to the work station where the printing order in question has been inputted. This message is displayed on screen 5 of that work station 1. The work station operator must respond to this message within a predetermined time, e.g., 30 seconds, via the keyboard 4, by inputting a command intended for this purpose, to show that the message was received. If there is no response within that predetermined time, the printing job is put to the back of the queue. If, however, the response is received within the predetermined time, a message is sent to the printer, which is displayed on display means 14 by the printer. The central control station waits for a second predetermined time, e.g., two minutes, for an answer-back from printer 3 to this message. The printer will send this answer-back after the operator has operated a predetermined code key of the keys 13. During this second predetermined time between the message to the printer and the expected answer-back by the printer, the operator has time to change the paper in magazine 15. If the answer-back has come in time, the printing job is started and the information to be printed is reproduced on the paper freshly placed in the magazine. After the completion of this printing job, the central control station 2 sends a message to printer 3 which indicates that the operator can again fill the magazine with the standard paper. This message is also displayed on display means 14. The operator has the opportunity for a predetermined time to place the standard paper in magazine 15 and send a message to central control station 2 by pressing a predetermined key of keys 13 on the control panel. The message being to the effect that the standard paper has again been placed in the magazine. If a message of this kind is not sent within that time, the printer is not released for the next printing order and at the beginning of a subsequent printing job a message will appear on display means 14 to show that a non-standard type of paper is present in the magazine.

If, when a print order is inputted, a command has been given to understand that a print must be printed on sheets fed via the semi-automatic paper feeder 11, as soon as this print job has reached the head of the queue, a message will be sent to the work station 1 and the print job will again be put at the back of the queue unless the operator has responded to this message within the predetermined time. If the response has been made at the proper time a message is fed by central control station 2 to printer 3 and this message is displayed on display means 14. This message indicates that a sheet of receiving material must be introduced into the machine via entry slot 16 of the semi-automatic feeder. Also, the message indicates that the operator must show by pressing a predetermined key 13 that the printing job may be started. As soon as the operator has pressed the correct key 13 and a detector 17 has detected the presence of a sheet in the semi-automatic paper feeder, printer 3 sends an answer-back to central control station 2. If central control station 2 receives the answer-back within a predetermined time after the message has been sent, the printing job is started and the information to be printed on the first sheet will be fed to the printer 3 for printing. If the answer-back is not received by control station 2 within the predetermined time, the job in question is again put at the back of the queue.

After each sheet introduced via feeder 11 has been printed, the printing job is interrupted and central control station 2 transmits a message to printer 3 to show that a subsequent sheet can be fed in via the semiautomatic paper feeder 11. This message is displayed on display means 14. As soon as detector 17 detects that a sheet has been entered, a supplementary command is fed to central control station 2. If the supplementary command is received before a predetermined time has elapsed, e.g., 30 seconds, after the message has been sent to printer 3 by the control station, control station 2 offers the information to be printed on the fed sheet to printer 3 for printing. If the supplementary command is not received within the predetermined period, performance of the job that has already been interrupted is finally stopped.

If the command added to the input printing order indicates that confidential information is involved, then as soon as the printing job in question reaches the head of the queue a message is sent to the work station 1 at which the relevant order has been input. This message is reproduced on the screen 5 of this work station. If this work station operator responds to this message within a predetermined period, e.g., 30 seconds, and inputs an answer-back command via the keyboard 4 of this work station, a message will then be transmitted to printer 3 to show that an identity code input is required. The operator of the printer 3 then has the opportunity to input the identity code within a predetermined time via the keys 13 of the control panel. As soon as the correct code has been input, a message is fed to control station 2 which in response thereto starts to perform the printing job in question.

While a presently preferred embodiment of the invention has been shown and described in particularity, it may be otherwise embodied within the scope of the appended claims.

What is claimed is:

1. In an office automation system having memory means for storing coded information for a print job, a printer including a print station for printing a print job of text information on receiving material after the supply of corresponding coded information, at least one command input means for inputting control commands, and a control means connected to said command inputting means for creating a print job after the supply of a first control command, connected to said printer for controlling a print job in response to the first control command and further connected to said memory means for obtaining coded print job information during a print job, the improvement in combination therewith comprising a detection means connected to said print station for providing a detection signal upon detection of an operator action at said print station in response to a second control command added to the first control command to postpone a print job until the occurrence of said operator action, said detection signal being transferred to said control means for commencing the operation of said printer.

2. In an office automation system according to claim 1, wherein said print station comprises input means for inputting a code and wherein said detection means in response to said second control command determines whether an input code to said input means corresponds to a required code and, upon conformity between the compared codes, generates said detection signal.

3. An office automation system according to claim 2, including a semi-automatic feeder connected to and cooperating with said printer for feeding print receiving material to said printing station wherein said detection means in response to the said second control command detects whether said receiving material is present in said semi-automatic feeder and if present provides said detection signal.

4. An office automation system according to claims 1, 2 or 3, including a printer display means for displaying a message, wherein said printer display means displays a message determined by said second control command when said control means is waiting for the said detection signal prior to starting a printing job determined by said first control command.

* * * * *